(12) United States Patent
Yokota et al.

(10) Patent No.: US 7,758,114 B2
(45) Date of Patent: Jul. 20, 2010

(54) SEAT BACK STRUCTURE OF VEHICLE SEAT

(75) Inventors: Masaaki Yokota, Tokyo (JP); Atsushi Koike, Tokyo (JP)

(73) Assignee: Tachi-S Co. Ltd., Tokyo (JP)

( * ) Notice: Subject to any disclaimer, the term of this patent is extended or adjusted under 35 U.S.C. 154(b) by 0 days.

(21) Appl. No.: 12/173,306

(22) Filed: Jul. 15, 2008

(65) Prior Publication Data

US 2010/0013275 A1 Jan. 21, 2010

(51) Int. Cl.
*B60N 2/42* (2006.01)
*B60N 2/427* (2006.01)
*B60N 2/48* (2006.01)
*B60R 21/00* (2006.01)

(52) U.S. Cl. .................................. 297/216.12
(58) Field of Classification Search ............. 297/216.12
See application file for complete search history.

(56) References Cited

U.S. PATENT DOCUMENTS

| | | | | |
|---|---|---|---|---|
| 6,199,947 B1 * | 3/2001 | Wiklund | ................. | 297/216.12 |
| 6,250,714 B1 * | 6/2001 | Nakano et al. | .......... | 297/216.12 |
| 6,375,262 B1 * | 4/2002 | Watanabe | ........... | 297/216.12 X |
| 6,568,753 B1 * | 5/2003 | Watanabe | .............. | 297/216.12 |
| 6,604,788 B1 * | 8/2003 | Humer | ................ | 297/216.12 X |
| 6,631,955 B2 * | 10/2003 | Humer et al. | ........ | 297/216.12 X |
| 6,655,733 B2 * | 12/2003 | Humer et al. | .......... | 297/216.12 |
| 6,789,846 B2 * | 9/2004 | Humer et al. | .......... | 297/216.12 |
| 7,077,472 B2 * | 7/2006 | Steffens, Jr. | ......... | 297/216.12 X |
| 7,097,242 B2 * | 8/2006 | Farquhar et al. | ........ | 297/216.12 |
| 7,104,602 B2 * | 9/2006 | Humer et al. | .......... | 297/216.12 |
| 7,237,838 B2 * | 7/2007 | Hoffmeister et al. | ... | 297/216.12 |
| 7,325,869 B2 * | 2/2008 | Braune | ................... | 297/216.12 |
| 7,393,052 B2 * | 7/2008 | Humer et al. | .......... | 297/216.12 |
| 7,404,606 B2 * | 7/2008 | Kim | ................... | 297/216.12 X |
| 7,540,562 B2 * | 6/2009 | Sekida | ................... | 297/216.12 |
| 2003/0001414 A1 * | 1/2003 | Humer et al. | .......... | 297/216.12 |
| 2003/0011224 A1 * | 1/2003 | Humer et al. | .......... | 297/216.12 |
| 2004/0119324 A1 * | 6/2004 | Humer et al. | .......... | 297/216.12 |
| 2004/0155496 A1 * | 8/2004 | Farquhar et al. | ....... | 297/216.12 |
| 2005/0280296 A1 * | 12/2005 | Ohchi et al. | ........... | 297/216.12 |
| 2008/0012402 A1 * | 1/2008 | Sekida | ................... | 297/216.12 |
| 2008/0185882 A1 * | 8/2008 | Humer et al. | .......... | 297/216.12 |
| 2009/0045658 A1 * | 2/2009 | Humer et al. | .......... | 297/216.12 |
| 2009/0102255 A1 * | 4/2009 | D'Agostini et al. | ..... | 297/216.12 |
| 2009/0179471 A1 * | 7/2009 | Humer et al. | .......... | 297/216.12 |

FOREIGN PATENT DOCUMENTS

| | | |
|---|---|---|
| JP | 11-34708 | 9/1999 |
| JP | 2000-325179 | 11/2000 |

\* cited by examiner

*Primary Examiner*—Rodney B White
(74) *Attorney, Agent, or Firm*—Browdy and Neimark, PLLC

(57) ABSTRACT

In a seat back with movable headrest, a pressure receiving element is movably provided, which includes pressure receiving regions for receiving loads applied from lumber and dorsal parts of seat occupant. The pressure receiving element is movably connected with a crank member which is movably provided between two lateral frame members of seat back frame. Further, that pressure receiving element is connected with a support shaft extended between a par of rotating links rotatably arranged on the respective afore-said two lateral frame members. A biasing element is provided to normally bias the headrest to a home position.

8 Claims, 6 Drawing Sheets

SEAT BACK STRUCTURE OF VEHICLE SEAT

BACKGROUND OF THE INVENTION

1. Field of the Invention

The present invention relates to a seat back structure of vehicle seat provided with a movable headrest. In particular, the invention is directed to a seat back structure of vehicle seat of the type comprising a headrest movably provided on the seat back and a pressure receiving element provided in the seat back and operatively connected with the headrest, with the arrangement thereof being such that when a rear-end collision occurs and a backward load is applied from a seat occupant to the pressure receiving element under a backward inertia of that seat occupant, the headrest is forcibly displaced forwardly and upwardly toward a point adjacent to a head of the seat occupant.

2. Description of Prior Art

Disclosed and known for example from the Japanese Laid-Open Patent Publication No. 11-34708 is a seat back structure of the foregoing kind which is designed for protecting a seat occupant's head against a rear-end collision. In brief, in the case of rear-end collision, the body of seat occupant is naturally displaced backwardly of the seat under a backward initial of the seat occupant, which in turn applies a corresponding load (or impact load) to a given pressure receiving element provided in the seat back. At this moment, with that pressure receiving element being moved backwardly, a headrest is forcibly at once displaced forwardly and upwardly to a point adjacent to a head of the seat occupant.

According to this kind of emergency active headrest, a biasing means, or a tension spring for example, is provided between the pressure receiving element and the headrest. Normally, the headrest is biasingly retained by such biasing means toward a lower home position where it receives a head of seat occupant in an ordinary manner. The biasing means in this headrest system, or the tension spring for example has a predetermined biasing force sufficient to withstand a weight of the seat occupant's upper body portion as well as a normal load applied from that upper body portion, unless an impact load is applied thereto in a rear-end collision case by a greater force than the seat occupant's upper body portion weight and the normal load. Hence, only when such great impact load is applied to the seat back, the pressure receiving element is moved backwardly against the biasing force of the tension spring, so that the headrest is displaced from the lower headrest home position in forward and upward directions towards a predetermined upwardly displaced point of headrest.

With such arrangement, when the rear-end collision occurs, the headrest is quickly displaced toward a head of seat occupant being concurrently displaced forwardly, thereby insuring to keep a smallest possible space between the seat occupants head and headrest, and therefore it is possible to effectively reduce a degree of subsequent backward inclination of the seat occupant's head, wherein such subsequent backward inclination of seat occupant's head is quickly followed by forward displacement of that particular head under a backward inertia of the seat occupant, as is known. Accordingly, in this prior art, an abrupt backward inclination of the seat occupant's head can be prevented assuredly, and it is possible to minimize injury of his or her neck portion or whiplash injury.

In the above-described known headrest system, the pressure receiving element, adapted for receiving an impact load caused by backward inertia of the seat occupant as stated above, is disposed at a point corresponding to a dorsal part of the seat occupant.

In general, when a seat occupant assumes normal seating posture on a seat, his or her lumbar part is in a substantially full contact with the surface of seat back, while by contrast, his or her dorsal part is in most cases positioned away from the seat back a certain distance. Thus, under a backward inertia of the seat occupant in the case of actual rear-end collision, the dorsal part of the seat occupant has to move backwards a distance corresponding to the afore-said certain distance between the seat back and that particular seat occupant's dorsal part, and then reach the pressure receiving element, at which moment, the pressure receiving element is pressed by that backwardly moved seat occupant's dorsal part and forcibly moved backwardly to cause forward and upward displacement of the headrest. This means that, upon occurrence of the rear-end collision, the seat occupant's dorsal part is moved backwardly the aforementioned distance and struck against the pressure receiving element. Consequently, it is more likely than not that the seat occupant's dorsal part might be suffered from or damaged by an excessive impact, due to its being strongly struck against the pressure receiving portion, which leaves a problem in this kind of active headrest system.

An example of solution to this problem is found in the Japanese Laid-Open Patent Publication No, 2000-325179 which teaches such head protection arrangement that, in a rear-end collision case, upon a seat occupant's lumbar part being pressed against a pressure receiving element, a headrest is immediately displaced upwardly to receive a head of the occupant.

This prior-art arrangement is indeed effective in view of the foregoing statement that the seat occupant's lumbar part is in a substantially full contact with the surface of seat back at the time when the seat occupant assumes normal seating posture on a seat. In other words, in the case of rear-end collision, such arrangement does not require undesired long moving distance of the lumbar part towards the pressure receiving element in the seat back, but permits that lumbar part to quickly reach and push the pressure receiving element. Hence, this lumbar active type of head projection system insures to lessen an impact applied from the pressure receiving element to the seat occupant's lumbar part.

In this sort of head protection system, a biasing means is provided to give a predetermined biasing force to both of the headrest and pressure receiving element, and generally stated, the biasing force is always imposed and active on all operative elements which are to be moved with every movement of the headrest, including that particular pressure receiving element and headrest. Consequently, in the rear-end collision case, it is necessary that a pressure overcoming such biasing force be continuously applied from the seat occupant's lumbar part to the pressure receiving element in order to cause upward displacement of the headrest to a given point for receiving seat occupant's head and also stably retain the headrest at that given point. However, the problem is that, in most of seat back used in this kind of seat, the upper region thereof for supporting the dorsal part of seat occupant is more elastic and cushiony than the lower region thereof for supporting the lumbar part of seat occupant, and therefore, the dorsal part of seat occupant will be more deeply sunk backwards into the upper region of seat back than his or her lumbar part. In that instance, the seat occupant's seating posture is naturally changed to shift his or her weight in a direction from the lumbar part to the dorsal part, which will possibly reduce the degree of load applied to the pressure receiving element from the seat occupant's lumbar part. Hence, as far as the present prior art relies only on a pressure from the seat occupant's lumbar part to the pressure receiving element, it is likely that, if that pressure is lower than a predetermine degree, the headrest will not reach the foregoing given point for supporting seat occupant's head and will not be retained at that point for safety purpose, neither.

Consequently, for the foregoing conventional seat back structure, it is possible that an excessive impact will be caused in the dorsal part of seat occupant at the time of commencement of the pressure receiving element to receive that dorsal part, and further, the seat occupant's lumar part will not sufficiently be pressed against the pressure receiving element, with the result that the pressure receiving element will not be moved enough to cause the headrest to displace to the point for supporting the seat occupant's head.

SUMMARY OF THE INVENTION

In view of the above-stated drawbacks, it is a primary purpose of the present invention to provide an improved seat back structure of vehicle seat with headrest, which avoids an excessive impact to the dorsal part of seat occupant in the case of rear-end collision at the time of commencement of pressure receiving portion to receive the seat occupant's dorsal part, and also insures to cause continued displacement of the headrest to an upwardly displaced point by a load applied from the lumbar part of seat occupant.

In order to achieve such purpose, there is basically provided a structure of seat back of vehicle seat in combination with a headrest, wherein the headrest has at least one stay portion and is displaceable between a home position where the headrest normally supports a head of a seat occupant on the vehicle seat and an upwardly displaced point to which the headrest is to be displaced upwardly from said home position, said structure of seat back of vehicle seat comprising:

a seat back frame including: an upper frame member defined upwardly of the seat back; and a pair of lateral frame members extending downwardly from the upper frame member, a pair of rotating links, each having an end portion and a pivotal point, the pair of rotating links being pivotally connected at the respective pivotal points thereof, with the pair of lateral frame members of said seat back frame, respectively;

a support shaft rotatably connected between the end potion of one of the pair of rotating links and the end portion of another of the pair of rotating links, such that clockwise and anticlockwise rotation of the pair of rotating links relative to the respective two pivotal points thereof causes vertical displacement of the support shaft along an arcuate path, at least one holder bracket of a substantially cylindrical configuration, such at least one holder bracket being integrally provided to the support shaft, the afore-said at least one stay portion of said headrest being inserted and retained in the afore-said at least one holder bracket, at least one guide element fixed on the upper frame member of the seat back frame, such at least one guide element being so formed that the aforesaid at least one holder bracket is slidingly inserted therein so as to be inclinable relative thereto, with such an arrangement that, upon anticlockwise rotation of the pair of rotating links relative to the respective two pivotal points thereof, the aforesaid at least one holder bracket is moved through the guide element in a direction upwardly of the seat back frame, so that the headrest is displaced to the afore-said upwardly displaced point, while being inclined relative to the guide element in a direction forwardly of the seat back frame;

a pressure receiving element including a first pressure-receiving region for receiving a load applied from a lumbar part of seat occupant and a second pressure-receiving region for receiving a load applied from a dorsal part of the seat occupant;

the afore-said pressure receiving element being connected with the support shaft and disposed in the seat back frame so as to extend along a vertical direction of the seat back frame;

a crank element rotatably connected between the afore-said pair of lateral frame members of the seat back frame so as to be rotatable in a direction backwardly and upwardly of the seat back frame;

the afore-said crank element being movably connected with the pressure receiving element; and a biasing means having a predetermined biasing force, the biasing means being adapted for normally biasing the headrest to the home position, wherein, in case of a rear-end collision, upon a load in excess of the predetermined biasing force being applied from said lumbar and dorsal parts in a direction backwardly of the seat back to the pressure receiving element under inertia of the seat occupant the pressure receiving element is displaced in a direction upwardly of the seat back frame with simultaneous backward and upward rotation of the crank element, thereby causing upward displacement of said support shaft and simultaneous anticlockwise rotation of the pair of rotating links relative to the respective two pivotal points thereof, thus resulting in the headrest being displaced in a direction from said home position towards said upwardly displaced point.

Preferably, the foregoing pressure receiving element may be formed by bending a rod material into a substantially U-shaped configuration having, defined therein, a pair of vertical rod sections each having an upper free end portion and a lower end, and a cross rod section integrally extended between the lower end of one of the pair of vertical rod sections and the lower end of another of the pair of vertical rod sections, wherein the pair of vertical rod sections correspond to the second pressure-receiving region and the cross rod section corresponds to the first pressure-receiving region, and wherein the respective two upper free end portions of the pair of vertical rod sections are connected with the support shaft.

As one aspect of the present invention, a pair of actuator link elements of stretchable and contractible type may be provided in the above-described seat back structure. Namely, each of the two actuator link elements is formed from a rigid material and having one end portion and another end portion, and disposed within the seat back frame, such that one of the pair of actuator link elements extends inwardly of and alongside of one of the pair of lateral frame members, whereas another of the pair of actuator link elements extends inwardly of and alongside of another of the pair of lateral frame members. The aforesaid one of the pair of actuator link elements is pivotally connected, at one end thereof, with the afore-said one of the pair of lateral frame members, while being pivotally connected, at another end thereof, with the second end portion of such one of the pair of rotating links. On the other hand, the afore-said another of said pair of actuator link elements is pivotally connected, at one end thereof, with the foregoing another of said pair of lateral frame members, while being pivotally connected, at another end thereof, with the second end portion of such another of said pair of rotating links. The crank element is disposed rotatably connected between the pair of actuator link elements as to be rotatable in a direction backwardly and upwardly of the seat back frame, the crank element being movably connected with the pressure receiving element.

Other various features and advantages of the present invention will become apparent from reading of the descriptions, hereinafter, with reference to the accompanied drawings.

DETAILED DESCRIPTION OF PREFERRED EMBODIMENT OF THE INVENTION

Referring to FIGS. 1 to 6(B), there are illustrated a first exemplary embodiment and a second alternative exemplary embodiment with regard to a seat back structure of vehicle seat in accordance with the preset invention. It is noted that the vehicle seat itself is not shown in the drawings, which comprises a seat back (10) to be elaborated hereinafter and an unshown seat cushion, but, it should be understood that a seat occupant (not shown) is to sit on the vehicle seat and rest his or her lumbar and dorsal parts on the seat back (10).

As shown, the seat back (10) is provided with an headrest (12) of an emergency active type workable in rear-end collision case, wherein, when a rear-end collision occurs, in response to a backward great pressure applied from a seat occupant on the vehicle seat under a backward inertia of the seat occupant the headrest (12) will be immediately displaced upwardly from a lower home point (indicated by the one-dot chained lines) to a given point where the headrest (12) assumes forwardly inclined state.

Designation (18) denotes a seat back frame provided in the seat back (10). The seat back frame (18) includes a generally inverted-U-shaped upper frame member (18c), a pair of lateral frame members (18a) (18a) and a headrest support frame member (18b).

The headrest support frame member (18b) has a downwardly sloped plate region (18b-1) which extends forwardly aslant therefrom and also extends in a direction transversely of the two lateral frame members (18a), and that each of the two lateral frame members (18a) extends downwardly from the upper frame member (18c).

It is noted that the wording, "forward" or "forwardly", refers to a side (FW) forwardly of the seat back (10) or vehicle seat (not shown), and the wording, "backward" or "backwardly", refers to a side (RW) backwardly the seat back (10) or vehicle seat.

Reference is first made to FIGS. 1 to 4(B) which shows a first mode of the seat back structure in accordance with the present invention.

Figure 2:
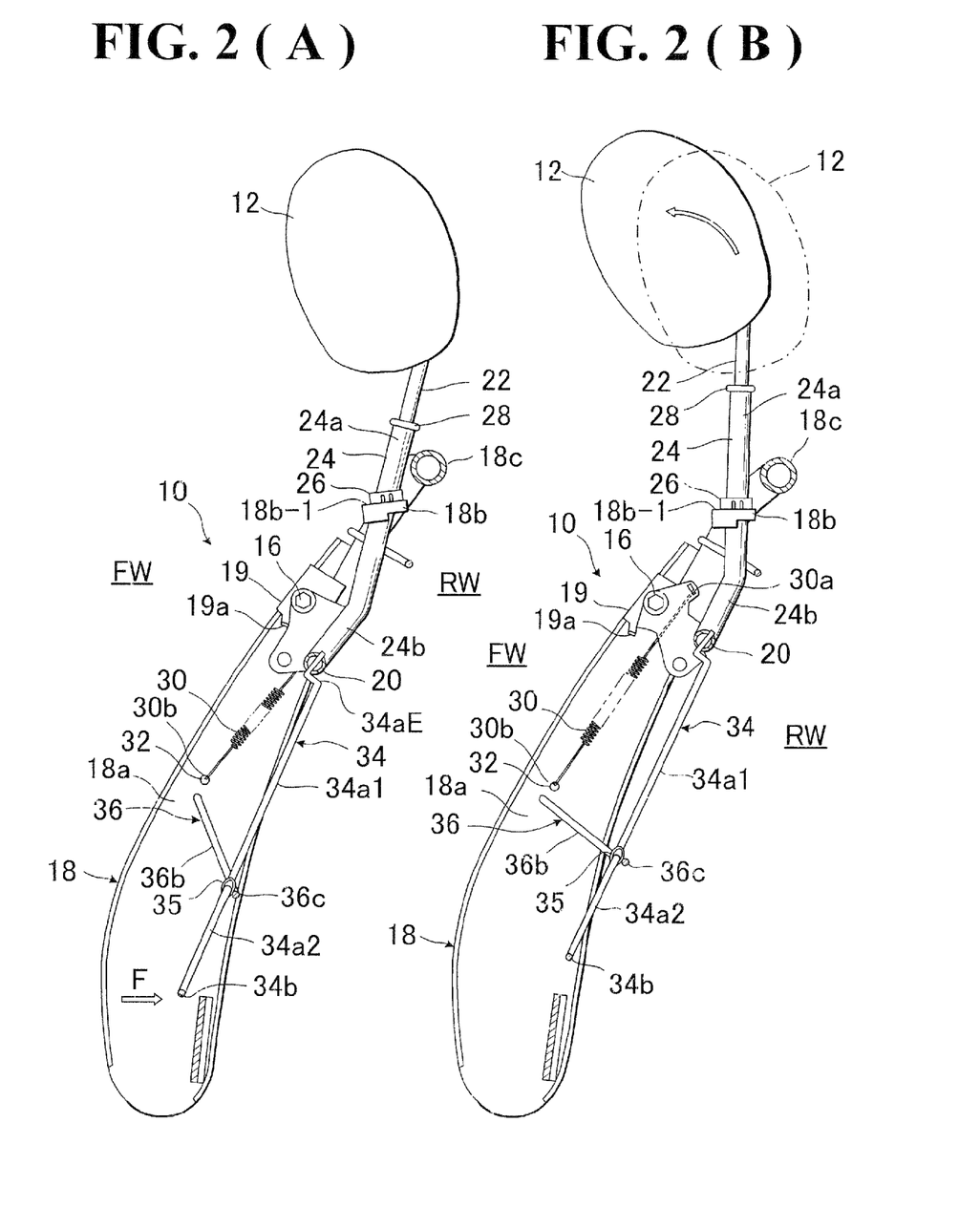
FIGS. 2(A) and 2(B) are each a side elevational view of the first embodiment of seat back structure, which explanatorily shows operation of a principal part thereof.
Figure 3:
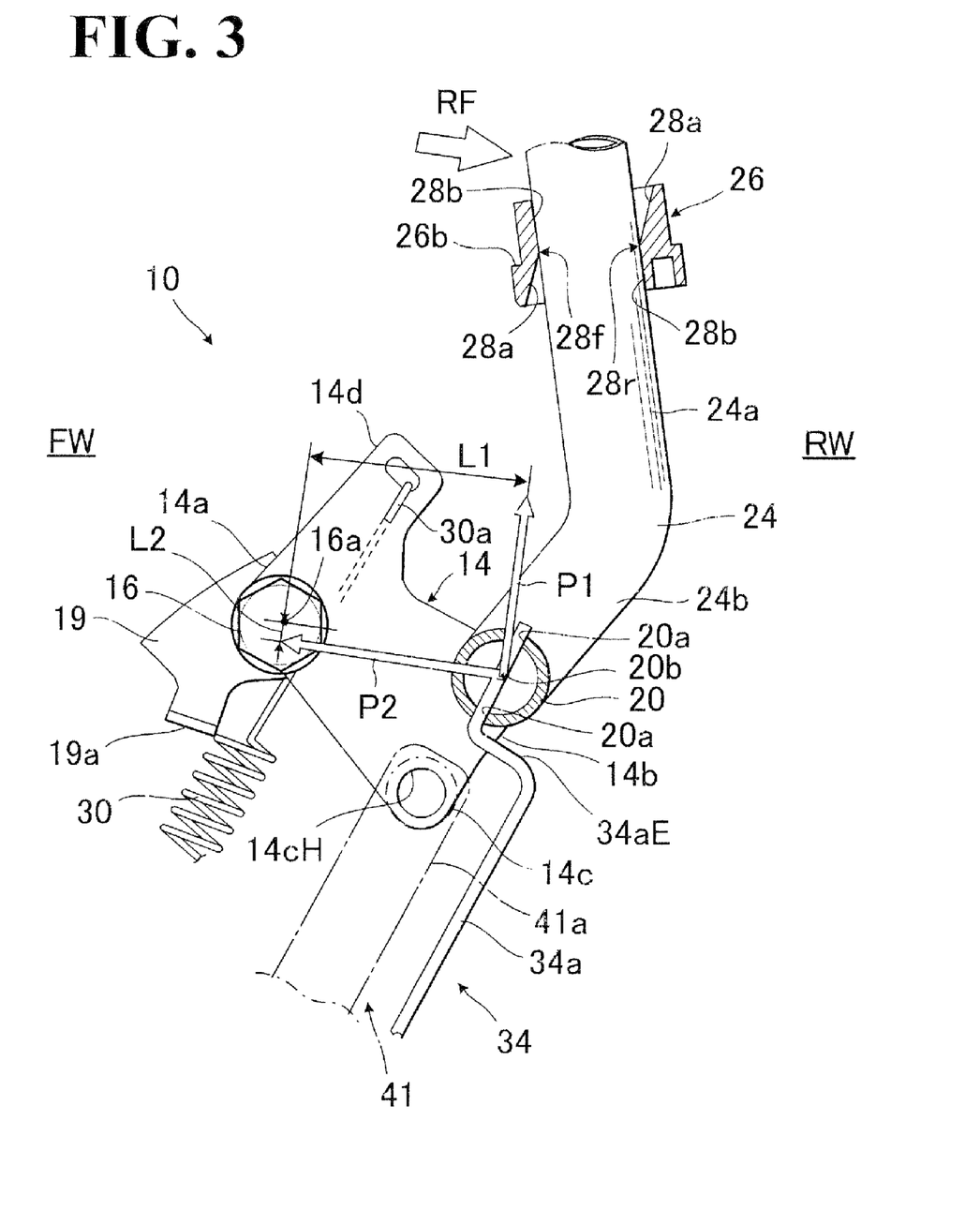
FIG. 3 is a fragmentary enlarged view showing a principal part of the invention.
Figure 4:
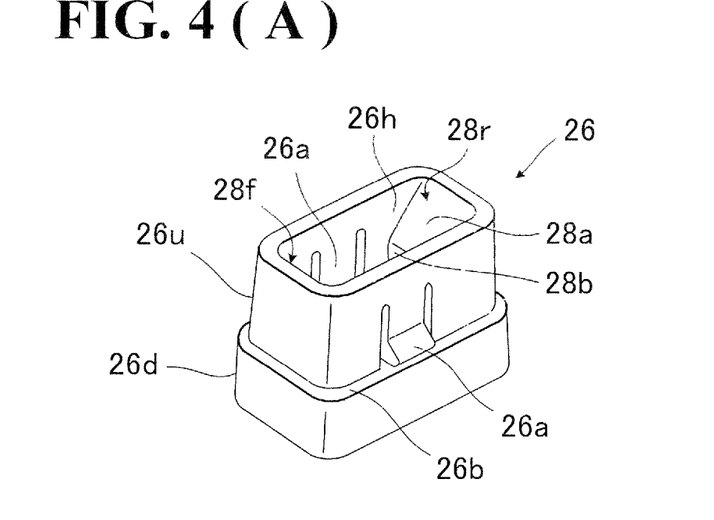
FIG. 4(A) is a schematic perspective view of a guide element used in the invention.
FIG. 4(B) is a diagram for explanatorily showing an operative relation between the guide element and a headrest.

As seen in the FIGS. 2(A) and 3, a left rotating link (14) is pivotally connected via a pin (16) with a connecting bracket (19) fixed to an upper region of left lateral frame member (18a) of the seat back frame (18) Likewise, while not shown clearly, it is to be understood that another right rotating link (14) identical to that left rotating link (14) is pivotally connected via a pin (16) with another connecting bracket (19) fixed to an upper region of right-side lateral frame member (18a).

As best shown in FIG. 3, each of the two rotating links (14) is so formed to comprise: a pivotal region (14a) which is pivotally connected via the pin (16) with the bracket (19) and faces to the forward side (FW); a first connecting region (14b) defined distant from the pivotal region (14a) in a direction to the backward side (RW); a second connecting region (14c) defined forwardly and downwardly of the first connecting region (14b); and a third connecting region (14d) which is defined distant from the pivotal region (14a) in a direction to the backward side (RW) and above the first connecting region (14b).

As shown, one end of a support shaft (20) is rotatably connected with the foregoing first, connecting region (14b) of left-side rotating link (14) and another end of the support shaft (20) is rotatably connected with a first connecting region (at 14b) of another right-side rotating link (14). Hence, the support shaft (20) is rotatably journalled between the two rotating links (14) so as to be rotatively displaceable upwardly and downwardly along an arcuate path relative to the pin (16) as understandable from FIGS. 1 and 2.

Firmly connected at its lower end with the support shaft (20) is a holder bracket (24) in which a stay (22) of headrest (12) is inserted and retained, thereby supportively connecting the headrest (12) with the seat back (10). A guide element (26) is securely engaged in the downwardly inclined region (18b-1) of the seat back frame upper member (18b). In brief, the guide element (26) is so adapted that the holder bracket (24) is slidably inserted therethrough at a certain angle with the seat back (10) that is set in the shown upright state when the seat back (10) is in a normal use, and that, on the other hand, upon rotation of the rotating link (14) in the case of rear-end collision case, the holder bracket (24) is to be displaced upwardly, while being inclined forwardly, with respect to the guide element (26), as understandable from FIGS. 2(A) and 2(B).

As seen in FIG. 3, the holder bracket (24) is of a generally dogleg shape as viewed from its lateral side, and has an upper rectilinear portion (24a) and a lower sloped portion (24b), such that the latter (24b) extends in a downwardly and forwardly slant direction from the former (24a). This holder bracket (24) is of a generally rectangular shape in cross-section having a hollow therein, and, a stay (22) of the headrest (12) is inserted in the inside of that holder bracket (24) via a stay holder (28) and received supportively therein.

The stay holder (28) is securely attached in the end region of the upper rectilinear portion (24a) of the holder bracket (24) at a given position by a lock mechanism (not shown) in the vertical direction thereof. The structure of the stay holder (28) is not the subject matter of the present invention and thus a further detailed description thereon is omitted.

As illustrated the upper rectilinear portion (24a) of the foregoing holder bracket (24) passes through a through-hole (26h) of the guide element (26) and is disposed therein.

As will be elaborated later, the holder bracket (24) is displaceable vertically through the guide element (26), while changing its inclination angle, between a lower headrest home position and an upwardly displaced point of headrest. Namely, in brief, as far as the illustrative embodiment is concerned, as understandable from FIGS. 2(A) and 4(B), when the holder bracket (24) is in the shown position where the upper rectilinear portion (24a) thereof is inclined backwardly at a first given angle relative to the downwardly sloped plate region (18b-1) of upper frame portion (18b), the headrest (12) is set at a normal home position, as indicated by "LOWER HEADREST HOME POSITION." On the other hand, as understandable from FIGS. 2(B) and 4(B), in the case of rear-end collision, when the headrest (12) is displaced upwardly from the lower home position, as indicated by "UPWARDLY DISPLACED POINT OF HEADREST", the holder bracket (24) is in the shown position where the upper rectilinear portion (24a) thereof is inclined forwardly at a second given angle relative to the downwardly sloped plate region (18b-1). Hereinafter, for the sake of simplicity, the wording "LOWER HEADREST HOME POSITION" shall be referred to as "lower headrest home position" or "lower home position", whereas the wording "UPWARDLY DISPLACED POINT OF HEADREST" be referred to as "upwardly displaced point of headrest" or "upwardly displaced point".

FIGS. 4(A) and 4(B) illustrate a specific structure of the guide element (26). According thereto, a forward inner wall (28f) and a backward inner wall (28r) are defined in the through-hole (26h) of the guide element (26). As in FIG. 4(B), respectively defined in such forward and backward inner walls (28f) and (28r) are a pair of first support surfaces (28a) and (28a) which are spaced apart from each other and disposed in an offset manner in relation to the through-hole (26h) so as to be in parallel with each other. Also, respectively defined in those two walls (28f) and (28r) are a pair of second support surfaces (28b) and (28b) which are spaced apart from each other and disposed in an offset manner in relation to the through-hole (26h) so as to be in parallel with each other. In other words one set of the first and second support surfaces (28a) (28b) is defined in the forward inner wall (28f), while another set of the first and second support surfaces (28a) (28b) is defined in the backward inner wall (28r).

In the illustrative embodiment, the guide element (26) itself is securely provided in the downwardly sloped plate region (18b-1) of seat back frame upper portion (18b), and, in view thereof, the two first support surfaces (28a) are both sloped with respect to the downwardly sloped plate region (18b-1) so as to provide an angle of inclination thereof equal to the aforementioned first given angle whereas the two second support surfaces (28b) are substantially perpendicular with the sloped plate region (18b-1) so as to provide an angle of inclination thereof equal to the aforementioned second given angle. Hence, when the headrest (12) is set in the above-noted lower headrest home position the pair of first support surfaces (28a) are in a close contact with the respective two opposite lateral surfaces of the holder bracket upper rectilinear portion (24a) thereby positively supporting the holder bracket (24) as indicated by the one-dot chain lines in FIG. 4(B). On the other hand, when the headrest (12) is displaced to and positioned at the above-noted upwardly displaced point of headrest, the pair of second support surfaces (28b) are in a close contact with the respective two opposite lateral surfaces of holder bracket upper rectilinear portion (24a) thereby positively supporting the holder bracket (24) as indicated by the two-dot chain lines in FIG. 4(B).

Designations (26a) in FIG. 3 and FIGS. 4(A) and 4(B) denote a pair of securing hook parts formed integrally with the guide element (26) so as to have a resilient property. In this respect the guide element (26) comprises upper and lower portions (26u) and (26d) and a shoulder region (26b) defined peripherally thereof between those upper and lower portions (26u) (26d). The two securing hook parts (26a) are formed in the upper portion (26u) so as to be spaced from the shoulder region (26b) a distance substantially equal to a thickness of the downwardly sloped plate region (18b-1). While not clearly shown formed in the downwardly sloped plate region (18b-1) is a bearing hole in which each guide element (20) is secured and from the drawings, any person skilled in the art will readily understand that the peripheral edge of such bearing hole in the sloped plate region (18b-1) is sandwiched between the two securing hook parts (26a) and shoulder region (26b), and therefore, the guide element (26) is securely attached in that particular sloped plate region (18b-1).

As constructed above, the support shaft (20) is supported by the two rotating links (14) in a vertically movable manner and therefore, as both two rotating links (14) are rotated, the support shaft (20) is simultaneously displaced in vertical direction, to thereby cause the headrest (12) to displace in the likewise vertical direction towards one of the previously stated lower home position and upwardly displaced point. More specifically with rotation of the two rotating links (14) relative to the pivot pin (16), the support shaft (20) located backwardly of that pivot pin (16) is subjected to either downward and forward displacement or upward and backward displacement along an arcuate path, relative to a central axis of the pivot pin (16). That is, clockwise rotation of rotating link (14) causes downward and forward displacement of the support shaft (20) relative to the pin (16), whereas anticlockwise rotation of rotating link (14) causes upward and backward displacement of the support shaft (20) relative to the pin (16). Hence, it follows that, with the afore-said downward and forward displacement of support shaft (20) the headrest (12) is displaced downwardly, while being inclined backwardly, relative to the guide element (26), whereas, with the aforesaid upward and backward displacement of support shaft (20), the headrest (12) is displaced upwardly, while being inclined forwardly relative to the guide element (26) (see FIGS. 2(A) and 2(B)).

In the present embodiment, as can be seen in FIGS. 2 and 3, a stopper piece (19a) is formed integrally with the connecting bracket (19) so as to project therefrom inwardly of the seat back frame lateral frame member (18a) to limit clockwise rotation of the rotating link (14), so that the headrest (12) is assuredly prevented against any further displacement beyond the lower headrest home position.

A pair of biasing means (30) and (30) are provided for giving biasing force to the respective two rotating links (14) so as to biasingly retain the headrest (12) at the lower headrest home position. In the present embodiment, the two biasing means (30) are each embodied by an extension coil spring. As illustrated, one extension coil spring (30) may be at the upper end (30a) thereof securely engaged with the third connecting region (14d) of the left-side rotating link (14) at a point above the support shaft (20), while being at the lower end (30b) thereof securely engaged in the connecting hole (18a2) formed in the lower region of the left-side lateral frame member (18a) of seat back frame (18). Likewise, as understandable by the dotted line in FIG. 1 as well as the foregoing spring (30), the other extension coil spring (30) may be at the upper end (30a) thereof securely engaged with a third connecting region (14d) of another right-side rotating link (14) at a point above the support shaft (20), while being at the lower end (30b) thereof securely engaged in a connecting hole (18a2) formed in the lower region of another right-side lateral frame member (18a). With such construction, a biasing force is always given from the extension coil springs (30) to the rotating links (14), thereby biasingly retaining the headrest (12) at the lower home position.

It is noted that a total biasing force of both two biasing means or two extension coil springs (30) is preset to such a degree that allows the springs (30) themselves to be resiliently stretchable only when they receive a great backward load caused under a backward inertia of seat occupant in a rear-end collision case, to thereby permit anticlockwise rotation of the two rotating links (14) so as to cause the headrest to move to the upwardly displaced point.

In accordance with a first mode of the present invention, briefly stated, the seat back (10) is of such a structure wherein a pressure receiving member (34) and a crank member (36) are arranged, which are workable together so as to receive the afore-said great backward load which is created from both dorsal and lumber parts of seat occupant, under backward inertia of the seat occupant, and then immediately transmit such backward toad to both two rotating links (14) as a force of rotation sufficient to cause the anticlockwise rotation of those two particular rotating links (14) against the biasing force of extension coil springs (30), so that the headrest (12) may reach the upwardly displaced point.

Figure 1:
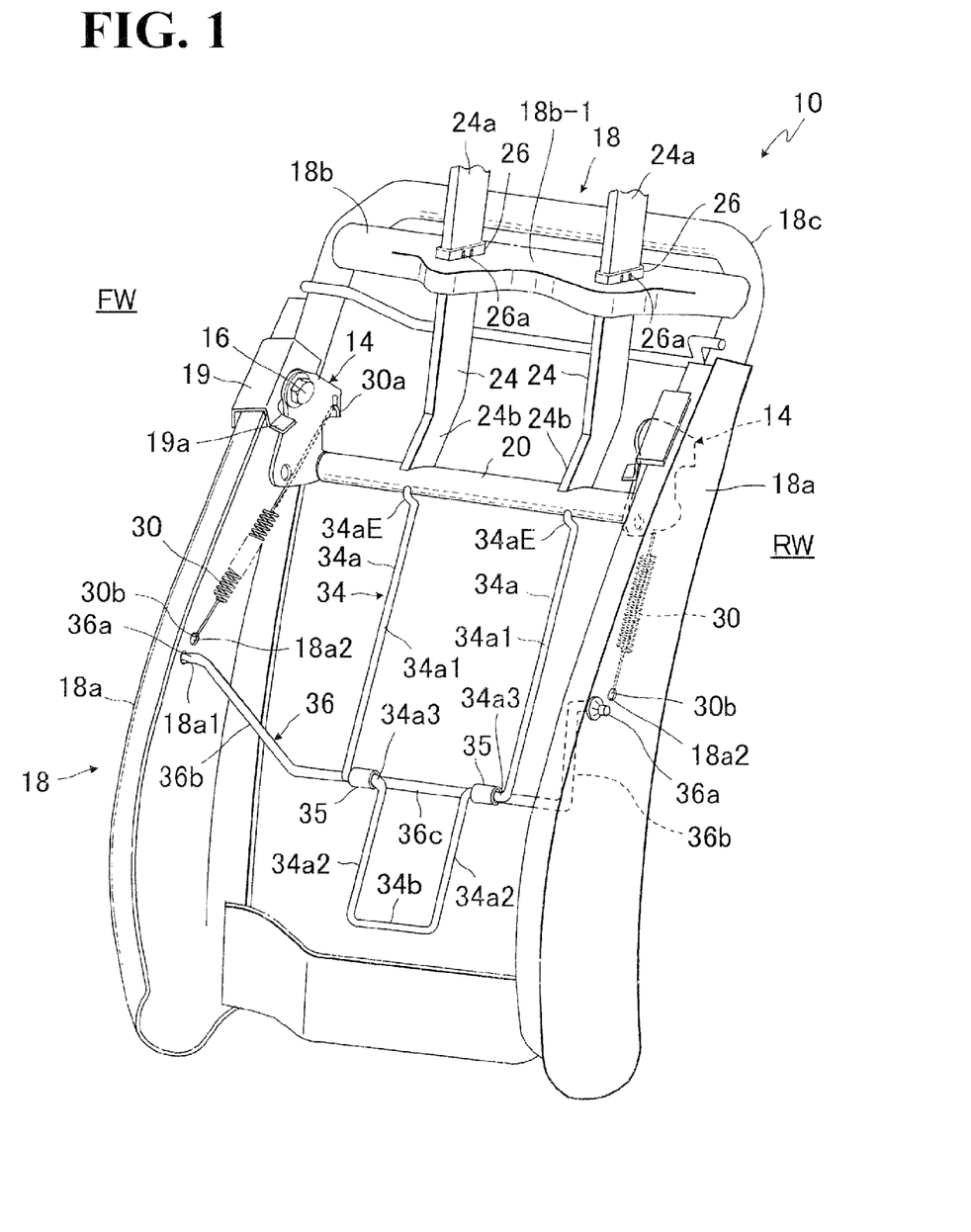
FIG. 1 is a partly broken schematic perspective view showing a first embodiment of seat back structure in accordance with the present invention.

As understandable from FIG. 1, the pressure receiving member (34) is of a substantially U-shaped configuration and arranged in the seat back frame (18) so as to extend vertically from the support shaft (20) and also extend centrally between the two lateral frame members (18a) and (18a) of the seat back frame (18).

Generically stated, the pressure receiving member (34) is formed by bending one rod material into a substantially U-shaped configuration which comprises a pair of vertical pressure receiving portions (34a) and (34a) adapted for receiving a load to be applied from a seat occupant's dorsal part (not shown) and a cross pressure receiving portion (34b) adapted for receiving a load to be applied from a seat occupant's lumber part.

The pressure receiving member (34) is formed from a rod material which is resiliently deformable by a load applied thereto in a direction intersecting the longitudinal body thereof while on the other hand having a rigidity in the longitudinal direction thereof sufficient to withstand a vertical load applied therealong and allow that vertical load to be transmitted therethrough without any deformation towards the support shaft (20). It is noted here that such vertical load is a great load applied along the longitudinal direction of the rod body of pressure receiving member (34), having a degree of force enough to raise the support shaft (20) and cause the above-described anticlockwise rotation of both two rotating links (14).

Further, generically stated, the crank member (36), having two ends (36a) and (36a) rotatably connected with the respective two lateral frame members (18a) and (18a) of seat back frame (18), is movably connected with the afore-said pressure receiving member (34) at a point between the vertical and cross pressure receiving portions (34a) and (34b) associated with that pressure receiving member (34).

More specifically, the crank member (36) is depicted in FIG. 1 to have: a horizontal main portion (36c); a pair of arm portions (36b) and (36b) extending angularly from the horizontal main portion (36c) ; and a pair of connecting end portions (36a) and (36a) extending horizontally in a direction opposite to each other from the respective two arm portions (36b) (36b).

As shown in FIG. 1, the crank member (36) is rotatably journalled between the two lateral frame members (18a) and (18a) of seat back frame (18), such that the two connecting end portions (36a) thereof are rotatably inserted in the respective two bearing holes (18a1) (18a2) that are each formed in the corresponding lateral frame member (18a) at a point adjacent to the forwardly facing end of that particular lateral frame member (18a) whereas the horizontal main portion thereof (36c) is disposed at a point adjacent to the backwardly facing end of that lateral frame member (18a). Both two connecting end portions 36a) of crank member (36) may be provided with suitable stoppers to prevent removal thereof from the respective two lateral frame members (18a).

On the other hand, as seen in FIG. 1, more specifically, the pressure receiving member (34) may be formed by bending one rod material into the illustrated configuration having:

(a) a pair of spaced-apart upper vertical rod sections (34a1) and (34a1);

(b) a pair of horizontal intermediate connecting rod regions (34a3) and (34a3) extending a given distance inwardly of the pressure receiving member (34) toward each other;

(c) a pair of spaced-apart lower vertical rod sections (34a2) and (34a2) which are offset inwardly from the respective upper vertical sections (34a1) (34A1) due to the respective two intermediate connecting regions (34a3) (34a3) stated above.

wherein the upper and lower vertical rod sections (34a1) (34a2) correspond to the previously mentioned vertical pressure receiving portion (34a);

and (d) a lower cross rod section (34b) corresponding to the previously mentioned cross pressure receiving portion (34b).

With regard to the foregoing two upper vertical rod sections (34a1), each upper end (34aE) thereof is securely inserted in a through-hole (20a) of the support shaft (20) (see FIG. 3), whereas each remaining main body portion thereof, excepting that upper end (34aE), extends downwardly from the support shaft (20) to the corresponding intermediate connecting regions (34a3). Both of so formed upper vertical rod sections (34a1) are adapted for receiving a load applied from a seat occupant's dorsal part (not shown).

The two intermediate horizontal connecting regions (34a3) are rotatably connected with the horizontal main portion (36c) of the crank member (36) via the respective two connecting tubular pieces (35) (35). Namely, each intermediate horizontal connecting region (34a3) rotatably passes through the corresponding connecting tubular piece (35) fixed on the crank member horizontal main portion (36c), thus establishing a rotatable connection of the crank member (36) with the pressure receiving member (34). In this regard, since the crank member main portion (36c) is movable along an arcuate path relative to a center of rotation which is at the crank member connecting end portions (36a), each connecting tubular piece (35) may be of a proper non-circular cross-sectional shape, such as elliptic cross-section, so as to absorb such arcutate movement of the crank member main portion (36c) with respect to the substantially rectilinear body of pressure receiving member (34).

It is to be seen that a width between the two lower vertical rod sections (34a2) is smaller than a width between the two upper sectional rod sections (34a1), and thus, such narrow distance between the two lower vertical rod sections (34a2) and the lower cross rod section (34b) cooperate with one another to provide an optimum plane for receiving a load (at F) applied from the lumbar part of seat occupant.

In this context, generally stated, when a seat occupant (not shown) using the present seat back structure assumes a normal seating or driving posture, a lumbar part of the seat occupant is substantially in a close contact with the corresponding surface area of seat back (10), whereas by contrast, a dorsal part of the seat occupant is in most cases positioned away from the seat back (10). Due to that fact, generally stated, in the case of rear-end collision, as the seat occupant is moved backwardly under his or her backward inertia, the lumbar part of the seat occupant is fist pressed against the lower cross rod section (34*b*) as well as against both two lower vertical rod sections (34*a*2), prior to his or her dorsal part being pressed against the two upper vertical rod sections (34*a*1).

Therefore, when a rear-end collision occurs, resulting in backward movement of a seat occupant under his or her backward inertia, a lumbar part of the seat occupant is first moved backwardly to exert a great backward load (F) upon the lower cross rod section (34*b*), and then, such backward load (F) is applied to an entirety of the pressure receiving member (34) as well as the crank member (36) at the same time. Consequently, as seen from FIG. 2(A) to FIG. 2(B), the pressure receiving member (34) is subjected to displacement in a direction backwardly and upwardly of the seat back frame (18), with simultaneous upward and backward rotation of the crank member (36) relative to the two end portions (36*a*) thereof.

Such backward and upward displacement of pressure receiving member (34) in turn exerts an upward force upon the support shaft (20) as well as upon the rotating link (14) fixed to that support shaft (20) at the same time. At this moment, if the load (F) exceeds the biasing force of the spring (30), both two rotating links (14) are permitted to rotate anticlockwise relative to its center of rotation (at 16) against the biasing force. In that case, both two rotating links (14) commence their anticlockwise rotations, and simultaneous therewith the support shaft (20) is subjected to backward and upward displacement relative to the rotation center (at 16) of rotating link (14).

Hereinafter, for the sake of simplicity, a description will mainly be made of the left-side parts of the above-described pairs of constituent elements (e.g. the pair of upper and lower vertical rod sections (34*a*1) (34*a*2), the pair of rotating links (14) the pair of springs (30) and so forth).

With the above-described arrangement, it is to be seen that a great upward pressing force, overcoming the biasing force of the biasing means (30), is applied from the pressure receiving member (34) to the support shaft (20) and at that moment, the rotating link (14) starts to rotate anticlockwise about the pin (16) to cause displacement of the headrest (12) towards the upwardly displaced point. In other words, upon a load being inputted from a seat occupant's lumbar part to the cross pressure receiving portion (34*b*), the rotating link (14) immediately starts its rotation, thereby insuring to reduce an impact given to the dorsal part of seat occupant at the point of time when the rotating link (14) starts its rotation.

Further, in spite of a relatively small stroke being given in the above-described backward displacement of seat occupant's lumbar part to the lower pressure receiving portion (34*b*), the above-constructed arrangement insures to transform the corresponding great backward load (F) into a great upward pressing force which causes upward displacement of the pressure receiving member (34), so strong as to cause the rotating link (14) to immediately commence anticlockwise rotation against the biasing force of the biasing means (30). This in turns causes both two upper vertical rod sections (34*a*1) (34*a*1) to immediately displace backwardly before it receives a backward load from the seat occupant's dorsal part, thus effectively avoiding a direct impact to that particular dorsal part, or reducing an impact thereto. Then, following the foregoing commencement of anticlockwise rotation of rotating link (14), a whole of the pressure receiving member (34) continues to be displaced backwardly by the backward load being applied from the seat occupant's lumbar part, so that the rotating link (14) continues its anticlockwise rotation to cause the headrest to displace towards the upwardly displaced point, while at the same time, the seat occupant's dorsal part, displaced backwardly under backward inertia of the seat occupant, is pressed against both two upper vertical rod sections (34*a*1) (34*a*1). Thus, the support shaft (20) receives increased backward and upward force from the two vertical rod sections (34*a*1) and is thereby displaced in further backward and upward direction. This assists in continued anticlockwise rotation of the rotating link (14) to insure displacement of headrest (12) towards the upwardly displaced point of headrest.

Accordingly, in the present invention, it is to be seen that, after the rotating link (14) has started the anticlockwise rotation as above, additional backward loads are applied from both seat occupant's lumbar and dorsal parts to the rotating link (14) as well as to the respective cross and vertical pressure receiving portions (34*b*) (34*a*), and therefore, the rotating link (14) continues its anticlockwise or backward rotation, so that the headrest (12) is continuously displaced toward the upwardly displaced point of headrest and eventually retained thereat so long as the afore-said additional backward loads are applied to the rotating link.

Further, it is to be seen that, after the rotating link (14) has started the anticlockwise rotation to execute the above-described prior backward displacement of both two upper vertical rod sections (34*a*1) (34*a*1) the seat occupant's dorsal part is pressed against such backwardly moving vertical rod sections (34*a*1) which means that an impact given from those two vertical rod sections (34*a*1) to the seat occupant's dorsal part is considerably lessened. Accordingly, it is to be appreciated that such prior anticlockwise rotation of the rotating link (14) and the subsequent continued likewise rotation of that particular rotating link (14) provides an increased insurance of lessening an impact given to the seat occupant.

In this connection, however, it must be considered that, in a rear-end collision, the seat occupant's dorsal part will be sunk deeply into the elastic surface of the seat back (10), which will change the seating posture of the seat occupant, and therefore, it is possible that the backward pressing force of seat occupant's lumbar part, caused under the backward inertia, to the cross pressure-receiving portion (34) may decrease correspondingly and may be insufficient to move the same (34). According to the present invention, at that moment, both two upper vertical rod sections (34*a*1) (34*a*1) receive the seat occupant's dorsal part being pressed thereagainst under backward inertia of that particular dorsal part, and are displaced backwardly, thereby resulting in continued anticlockwise rotation of the rotating link (14) against the biasing force of the biasing means (30), so that the headrest (12) continued to be displaced towards the upwardly displaced point of headrest and is eventually retained thereat so long as a backward load is applied from the seat occupant's dorsal part to the two upper vertical rod sections (34*a*1). Hence, in the present invention, without any resort to the backward load from the seat occupant's lumbar part alone, the headrest (12) can also be displaced by the backward load from the seat occupant's dorsal part, in a direction to the upwardly displaced point of headrest, and be retained thereat.

In addition, a whole of the pressure receiving member (34), by the reason of its resilient property stated previously, can be warped backwardly of the seat cushion frame (18), which also lessens an impact to both lumbar and dorsal parts of seat occupant.

Accordingly, the present invention makes it possible to simply achieve both of the following two aspects: a high performance of the above-described prior anticlockwise rotation of rotating link (14) which avoids excessive impact given to a seat occupant; and a high reliability of the above-described mechanism that insures to displace the headrest to the upwardly displaced point of headrest and retain thereat, without resort to the pressing force applied from the seat occupant's lumber part.

Furthermore, according to the present first embodiment, the crank member (36) and pressure receiving member (34) are only provided as a major constituent element for receiving both two loads applied from the respective lumbar and dorsal parts of seat occupant and also achieving the above-described various effects and advantages, which therefore greatly simplifies the structure of seat back (10).

The crank member (36) can be easily attached to both two lateral frame members (18a) of seat back frame (18) by simply securing the two ends (36a) thereof rotatably in the respective two bearing holes (18a1) formed in the respective two lateral frame members (18a). Also, the pressure receiving member (34) can be easily connected between that crank member (36) and the support shaft (20) by simply connecting the intermediate region (at 34a3) thereof with that crank member (36) via the connecting tubular pieces (35), while simply inserting the two upper ends (at 34aE) thereof in the respective two through-holes (20a) formed in the support shaft (20).

Thus, it is possible to easily and accurately locate the parts in the corresponding positions during assembly of seat back, thereby making formation of relevant parts in the seat back more efficient and rapid.

Still further, in the present invention, there is no guide means, such as a guide hole, for guiding the pressure receiving member (34), which permits great freedom of movement of that pressure receiving member (34). Hence, upon receiving a load (F), the pressure receiving member (34) is quickly displaced backwardly to insure highly rapid movement of the headrest (12) to the upwardly displaced point.

In the present embodiment, the biasing means (30) is provided as a biasing force that always efforts to return the headrest (12) to the lower headrest home position, and therefore, in order to retain the headrest (12) at the upwardly displaced point of headrest, it is necessary to keep providing a greater force than such biasing force, to the headrest (12). In this regard, a comparative review of FIGS. 2(A) and 2(B) indicates that the rotating link (14) has been rotated anticlockwise by a certain angle of rotation, which means that the headrest (12) is positioned at the upwardly displaced point. Under such state, according to the present invention, with respect to such angle of rotation of the rotating link (14), a line of force of that extension coil spring (30) is disposed at a point adjacent to and backwardly of the central axis (16a) of pivot pin (16) This arrangement is intended to reduce a biasing force transmission efficiency of the extension coil spring (30) which attempts to transmit a clockwise biasing force to the rotating link (14) for return of the headrest (12) to the lower headrest home position.

Namely, in such particular arrangement, the line of force of the biasing means (30), or the extension coil spring, is disposed adjacent to the pivotal point (16a) of the rotating link (14), which is effective in intentionally decreasing the biasing force transmission efficiency of the extension coil spring (30) to transmit its biasing force to the rotating link (14) that has been rotated anticlockwise as in FIG. 2(B), with the headrest (12) set at the upwardly disposed point. This insures to weaken a biasing force required for the extension coil spring (30) to cause clockwise rotation of the rotating link (14) sufficient to initiate return of the headrest (12) to the lower home position from the upwardly displaced point. Hence, when the headrest (12) is at the upwardly disposed point, the biasing force of the spring (30) can be overcome by a relatively small force. In other words, insofar as at least one load exceeding a predetermined degree is applied from either of the seat occupant's lumbar and dorsal parts to the biasing means (30) through the corresponding one of the vertical and cross pressure-receiving portions (34a) (34b), the biasing force of the extension coil spring (30) is overcome thereby and inactive, so that the rotating link (14) is still retained in the state shown in FIG. 2(B), and therefore, the headrest (12) is retained at the upwardly displaced point. Such particular arrangement insures to retain the headrest (12) at the upwardly displaced point in a rear-end collision case or the like, thereby providing a high reliable headrest action.

Reference is now made to FIG. 3 which shows an angular relation among the rotating link (14), support shaft (20) and holder bracket (24) under the above-described state where the rotating link (14) has been rotated anticlockwise by the angle of rotation shown in the FIG. 3, with the headrest (12) being positioned at the upwardly displaced point.

As stated previously, the holder bracket (24) is slidably inserted in the guide element (26) secured on the seat back frame upper member (18b) in such a manner as to be inclinable in the previously mentioned manner, and the lower portion (24b) of the holder bracket (24) is integrally connected with the support shaft (20) extended between the left-side and right-side rotating links (14).

Now, let us assume that a rear-end collision occurs and a head of seat occupant therefore moves forwardly and quickly moves back to the headrest (12), thereby inputting a backward load of the head, or what is generally described as a rebound load, to that headrest (12), as indicated by the solid arrow (RF) in FIG. 3. Such rebound load (RF) is oriented in a direction below the central axis (16a) of pivot pin (16) which is a center of rotation of the rotating link (14). Thus, there is the possibility that the rotating link (14) may be caused by the rebound load (RF) to rotate clockwise, which will undesirably result in downward displacement of the headrest (12) from the upwardly displaced point to the lower home position.

However, in the present invention, as seen in the FIG. 3, an active force (P2) generated by the rebound load (RF) at the support shaft (20) is oriented in a direction not consistent with rotation direction of the rotating link (14) required to displace the headrest (12) to the lower home position. Therefore, the rebound load (RF) applied to the rotating link (14) does not develop into any active force enough to cause the headrest (12) to move towards the lower home position.

Further, under the same situation as stated above, where the rotating link (14) has been rotated anticlockwise as in FIG. 3 and the headrest (12) is positioned at the upwardly displaced point, suppose that a rear-end collision occurs. In that instance, as understandable from FIG. 3, abrupt backward movement of both lumbar and dorsal parts of seat occupant to the pressure receiving member (34) generates and applies an upward active force (P1) to the support shaft (20), while at the same time, the above-noted rebound load (RF) exerted on the headrest (12) generates and applies an different active force (P2) to the support shaft (20). In this case also, the rebound load (RF) is applied to the rotating link (20) in a direction below the rotation center (at 16*a*) of that particular rotating link (14), which may develop the rebound load (RF) into an active force sufficient to cause clockwise rotation of the rotating link (14) for downward displacement of the headrest (12) to the lower home position.

However, in the present invention, as seen in FIG. 3, a distance (L2) between the active point of the active force (P2) of the rebound load (RF) and the central axis (16*a*) of the pivot pin (16) of the rotating link (14) is apparently quite smaller than a distance (L1) between the central axis (20*b*) of the support shaft (20) and the pivotal point's central axis (16*a*). Hence, a torque (P2×L2) attained by the rebound load (RF), which attempts to cause clockwise rotation of the rotating link (14), is considerably smaller than a torque (P1×L1) attained by the upward force transmitted from the seat occupant's lumbar and dorsal parts through the pressure receiving member (34), which attempts to cause anticlockwise rotation of the rotating link (14).

This torque relation is expressed by the following formula: P2×L2<<P1×L1.

Namely, the upward force transmitted from the pressure receiving member (34) is extremely greater than the rebound load (RF) transmitted from the headrest (12), whereupon the rotating link (14) is still biased in the anticlockwise direction, thereby insuring to prevent the headrest (12) against downward displacement toward the lower home position, so that the headrest (12) is retained unmoved at the upwardly displaced point, irrespective of the rebound load (RF) being applied thereto.

Accordingly, the foregoing structural aspect also insures to retain the headrest (12) at the upwardly displaced point in a rear-end collision case or the like, thereby positively adding to the high reliable emergency headrest action of the present invention.

In the present mode of the invention, as described previously, the guide element (26) is so formed to have, provided in combination therein, two first support surfaces (28*a*) and two second support surfaces (28*b*) in such a manner that one set of those support surfaces (28*a*) (28*b*) are defined in the respective forward and backward inner walls (28*f*) (28*r*) thereof, as seen in FIGS. 4(A) and 4(B). It is to be seen that the two first support surfaces (28*a*) assume a certain common angle of inclination which is equal to an angle of inclination at which the holder bracket upper rectilinear portion (24*a*) is inclined when the headrest (12) is displaced to the upwardly displaced point whereas the two second support surfaces (28*b*) assume a certain common angle of inclination which is equal to an angle of inclination at which the holder bracket upper rectilinear portion (24*a*) assumes when the headrest is at the lower home position. It is therefore appreciated that such arrangement of guide element (26) insures that both two opposite lateral surfaces of the holder bracket upper rectilinear portion (24*a*) are brought in close contact with and positively retained between the respective two support surfaces (28*a* or 28*b*) stated above, whichever the headrest is at the lower home position or at the upwardly displaced point. This assuredly retains the holder bracket (24) against wobbling or rattling at the guide element (26), thus insuring to prevent dangerous dislocation of the headrest (12) from a given point for receiving and supporting a head of seat occupant at any one of the lower home position and upwardly displaced point.

Figure 5:
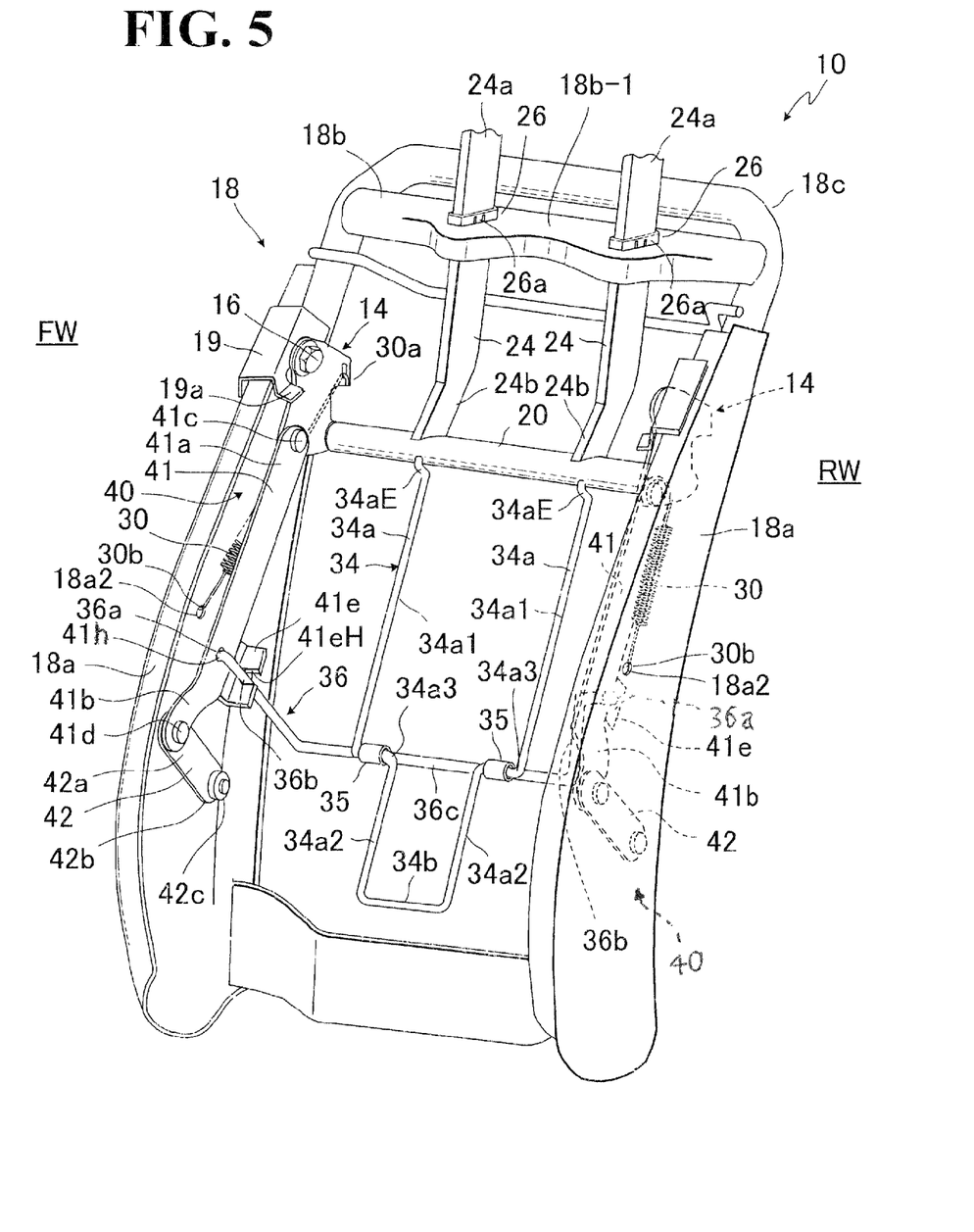
FIG. 5 is a partly broken schematic perspective view showing a second embodiment of seat back structure in accordance with the present invention.
Figure 6:
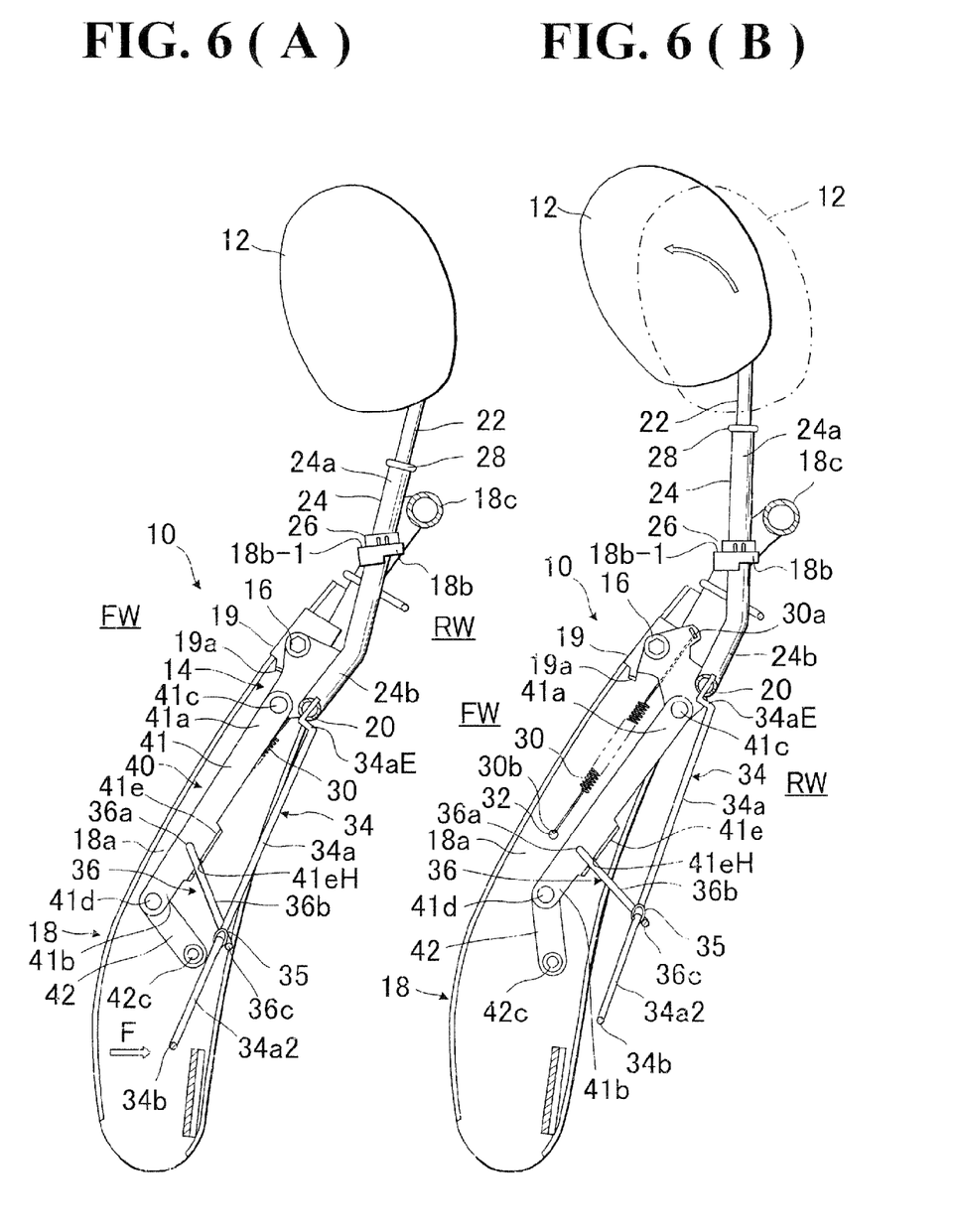
FIGS. 6(A) and 6(B) are each a side elevational view of the second embodiment of seat back structure, which explanatorily shows operation of a principal part thereof.

FIGS. 5 and FIGS. 6(A) and 6(B) illustrates a second alternative embodiment of the present invention wherein a pair of actuator link elements (40) and (40) are only provided in the above-described first embodiment. Hence, this second embodiment is identical in structure and component parts to the above-described first embodiment, only excepting such provision of two actuator link elements (40). It is therefore to be understood that all like designations to be given hereinafter correspond to all like designations that have been used and shown previously and any further description is omitted for the common constituent parts and elements found between the first and second embodiments.

As shown by way of example, each of the two actuator link assemblies (40) (40) is basically formed by a combination of an upper long link member (41) and a lower short link member (42), such that those two link members (41) (42) are rotatably connected with each other.

Specifically, the upper long link member (41) is at the upper end (41*a*) thereof pivotally connected via a pin (41*c*) with the second connecting region (14*c*) of rotating link (14), while being at the lower end (41*b*) thereof pivotally connected via a pin (41*d*) with an upper end (42*a*) of the lower short link member (42). The lower end (42*b*) of the lower short link member (42) is pivotally connected via a pin (42*c*) with the inward surface of the seat back frame lateral frame member (18*a*), thereby allowing the upper end (42*a*) of lower short link member (42) to be rotatable upwardly and downwardly relative to the pin (42*c*). With such construction, it is seen that, upon the upper long link member (41) being moved in a direction backwardly and upwardly of the seat back frame (18), with concurrent clockwise rotation of the lower short link member (42), an entirety of the actuator link element (40), is stretched to increase its length in the longitudinal direction thereof, whereas on the other hand, upon the upper long link member (41) being moved in a direction forwardly and upwardly of the seat back frame (18), an entirety of the actuator link element (40) is contracted to decrease its length.

As seen in FIG. 5, the crank member (36) is, at the two horizontal end portions (36*a*) (36*a*) thereof, rotatably secured in the respective two connecting holes (41*h*) formed in the respective two upper long link members (41) of the two actuator link elements (40).

Designations (41*e*) and (41*e*) denote a pair of guide/stopper members adapted for guiding the respective two actuator link elements (40) (40) in conjunction with movement of the crank member (36) and also limiting further unrequited downward displacement of the crank member (36) at the point of time when the headrest (12) is set at the lower home position. Each guide/stopper member (41*e*) is fixedly attached to each of the upper long link member (41) and has a recessed region (41*e*H) formed therein. As shown, each arm portion (36*b*) of the crank member (36) passes through such recessed region (41*e*H). With the above-described arrangement, when a rear-end collision occurs, a whole of the pressure receiving element (34) is displaced by a load applied from seat occupant's lumbar and dorsal parts in a direction backwardly and upwardly of the seat cushion frame (18) in the same manner as described previously in the first embodiment. Simultaneously therewith, such displacement of the pressure receiving element (34) causes the crank member (36) to displace backwardly and upwardly, with each arm portion (36*b*) of the crank member (36) contacting an edge of the recessed region (41*e*H) of the guide/stopper member (41*e*), so that the upper long link member (41) is subjected to backward and upward displacement, with concurrent clockwise rotation of the lower short link member (42) relative to the pin (42*c*). Thus, the two actuator link elements (40) (40) are stretched to increase its length in the longitudinal direction thereof to thereby apply an upward force to the respective two rotating links (14), thus attempting to cause anticlockwise rotation of both two rotating links (14) (14). At this moment, those two rotating links (14) also simultaneously receives an upward force from the pressure receiving element (34) which is being concurrently displaced backwardly and upwardly to raise the rotating links (14) as stated earlier.

Accordingly, the previously discussed quick commencement and continuation of anticlockwise rotation of both two rotating links (14) is made more positive and assured by application thereto of the foregoing two upward forces from the pressure receiving element (34) and the two actuator link elements (40).

The embodiment described thus far is just intended for explaining one aspect of the present invention, and therefore it should be understood that the present invention is not limited to the illustrated embodiment, but any other modification and rearrangement may be applied to the invention without departing from the scopes of the appended claims.

The present invention is generally applied to a headrest connectable with and releasable from a seat back, as described above, but may be applied to a headrest of the type that is not releasable from the seat back, for example.

What is claimed is:

1. A structure of seat back of vehicle seat in combination with a headrest, wherein said headrest has at least one stay portion and is displaceable between a home position where the headrest normally supports a head of a seat occupant on the vehicle seat and an upwardly displaced point to which the headrest is to be displaced upwardly from said home position, said structure of seat back of vehicle seat comprising:

a seat back frame including: an upper frame member defined upwardly of the seat back; and a pair of lateral frame members extending downwardly from said upper frame member, a pair of rotating links, each having an end portion and a pivotal point, said pair of rotating links being pivotally connected, at the respective pivotal points thereof, with said pair of lateral frame members of said seat back frame, respectively;

a support shaft rotatably connected between said end portion of one of said pair of rotating links and said end portion of another of said pair of rotating links, such that clockwise and anticlockwise rotation of said pair of rotating links relative to the respective two pivotal points thereof causes vertical displacement of said support shaft along an arcuate path;

at least one holder bracket of a substantially cylindrical configuration, and said at least one holder bracket being integrally provided to said support shaft, said at least one stay portion of said headrest being inserted and retained in said at least one holder bracket, at least one guide element fixed on said upper frame member of said seat back frame, said at least one guide element being so formed that said at least one holder bracket is slidingly inserted therein so as to be inclinable relative thereto, with such an arrangement that, upon anticlockwise rotation of said pair of rotating links relative to the respective two pivotal points thereof, said at least one holder bracket is moved through said guide element in a direction upwardly of said seat back frame, so that said headrest is displaced to said upwardly displaced point, while being inclined relative to said guide element in a direction forwardly of said seat back frame;

a pressure receiving element including a first pressure-receiving region for receiving a load applied from a lumbar part of seat occupant and a second pressure-receiving region for receiving a load applied from a dorsal part of said seat occupant, wherein said first and second pressure-receiving regions are defined integrally with each other in said pressure-receiving element;

said pressure receiving element being connected with said support shaft and disposed in said seat back frame so as to extend along a vertical direction of said seat back frame;

a crank element rotatably connected between said pair of lateral frame members of said seat back frame so as to be rotatable in a direction backwardly and upwardly of the seat back frame;

said crank element being movably connected with said pressure receiving element; and a biasing means having a predetermined biasing force, said biasing means being adapted for normally biasing said headrest to said home position, wherein, in case of a rear-end collision, upon a load in excess of said predetermined biasing force being applied from said lumbar and dorsal parts in a direction backwardly of the seat back to said pressure receiving element under inertia of said seat occupant, said pressure receiving element is displaced in a direction upwardly of the seat back frame, with simultaneous backward and upward rotation of said crank element, thereby causing upward displacement of said support shaft and simultaneous anticlockwise rotation of said pair of rotating links relative to the respective two pivotal points thereof, thus resulting in said headrest being displaced in a direction from said home position towards said upwardly displaced point.

2. The structure of seat back according to claim 1, wherein said pressure receiving element is formed by bending a rod material into a substantially U-shaped configuration having, defined therein, a pair of vertical rod sections each having an upper free end portion and a lower end, and a cross rod section integrally extended between said lower end of one of said pair of vertical rod sections and said lower end of another of said pair of vertical rod sections, wherein said pair of vertical rod sections correspond to said second pressure-receiving region and said cross rod section corresponds to said first pressure-receiving region, and wherein the respective two upper free end portions of said pair of vertical rod sections are connected with said support shaft.

3. The structure of seat back as claimed in claim 1, wherein said support shaft and said pair of rotating links are arranged such that, when said headrest is positioned at said upwardly displaced point, a torque (P2×L2) attained by a rebound load (RF), which attempts to cause clockwise rotation of said pair of rotating links relative to said pivot point, is smaller than a torque (P1×L1) attained by a force transmitted to said support shaft from the seat occupant's lumbar and dorsal parts through said pressure receiving member, which attempts to cause said anticlockwise rotation of said pair of rotating links.

4. The seat back structure as claimed in claim 1, wherein said guide element has a through-hole formed therein, said through-hole being adapted to allow said holder bracket to be inserted therein, and said guide element also has, defined in said through-hole, a forward inner wall facing forwardly of the seat back and a backward inner wall facing backwardly of the seat back, wherein a pair of first support surfaces are defined in said forward and backward inner walls, respectively, so as to be disposed in a spaced-apart and offset manner in relation to said through-hole, wherein a pair of second support surfaces are defined in said forward and backward inner walls, respectively, so as to be disposed in a spaced-apart and offset manner in relation to said through-hole, and wherein said pair of first support surfaces extend in parallel with each other and are inclined by an angle equal to an angle of inclination assumed by said holder bracket when said headrest is at said home position, whereas on the other hand, said pair of second support surfaces extend in parallel with each other and are inclined by an angle equal to an angle of inclination assumed by said holder bracket when said headrest is at said upwardly displaced point, thereby allowing said holder bracket to be retained between said pair of first support surfaces when said headrest is at said home position, while allowing said holder bracket to be retained between said pair of second support surface when said headrest is at said upwardly displaced position.

5. A structure of seat back of vehicle seat in combination with a headrest, wherein said headrest has at least one stay portion and is displaceable between a home position where the headrest normally supports a head of a seat occupant on the vehicle seat and an upwardly displaced point to which the headrest is to be displaced upwardly from said home position, said structure of seat back of vehicle seat comprising:

a seat back frame including: an upper frame member defined upwardly of the seat back; and a pair of lateral frame members extending downwardly from said upper frame member, a pair of rotating links, each having a first end portion, a second end portion, and a pivotal point, said pair of rotating links being pivotally connected, at the respective pivotal points thereof, with said pair of lateral frame members of said seat back frame, respectively;

a support shaft rotatably connected between said first end portion of one of said pair of rotating links and said first end portion of another of said pair of rotating links, such that clockwise and anticlockwise rotation of said pair of rotating links relative to the respective two pivotal points thereof causes vertical displacement of said support shaft along an accurate path;

at least one holder bracket of a substantially cylindrical configuration, said at least one holder bracket being integrally provided to said support shaft, said at least one stay portion of said headrest being inserted and retained in said at least one holder bracket, at least one guide element fixed on said upper frame member of said seat back frame, said at least one guide element being so formed that said at least one holder bracket is slidingly inserted therein so as to be inclinable relative thereto, with such an arrangement that, upon anticlockwise rotation of said pair of rotating links relative to the respective two pivotal points thereof, said at least one holder bracket is moved through said guide element in a direction upwardly of said seat back frame, so that said headrest is displaced to said upwardly displaced point, while being inclined relative to said guide element in a direction forwardly of said seat back frame;

a pair of actuator link elements of stretchable and contractible type, each being formed from a rigid material and having one end portion and another end portion, said pair of actuator link elements being disposed within said seat back frame, such that one of said pair of actuator link elements extends inwardly of and alongside of one of said pair of lateral frame members, whereas another of said pair of actuator link elements extends inwardly of and alongside of another of said pair of lateral frame members, said one of said pair of actuator link elements being pivotally connected, at one end thereof, with said one of said pair of lateral frame members, while being pivotally connected, at another end thereof, with said second end portion of said one of said pair of rotating links;

said another of said pair of actuator link elements being pivotally connected, at one end thereof, with said another of said pair of lateral frame members, while being pivotally connected, at another end thereof, with said second end portion of said another of said pair of rotating links;

a pressure receiving element including a first pressure-receiving region for receiving a load applied from a lumbar part of seat occupant and a second pressure-receiving region for receiving a load applied from a dorsal part of said seat occupant, wherein said first and second pressure-receiving regions are defined integrally with each other in said pressure receiving element;

said pressure receiving element being connected with said support shaft and disposed in said seat back frame so as to extend along a vertical direction of said seat back frame, said pressure receiving element being disposed between said pair of actuator link elements;

a crank element disposed rotatably connected between said pair of actuator link elements as to be rotatable in a direction backwardly and upwardly of the seat back frame, said crank element being movable connected with said pressure receiving element; and a biasing means having a predetermined biasing force, said biasing means being adapted for normally biasing said headrest to said home position, wherein, in the case of a rear-end collision, upon a load in excess of said predetermined biasing force being applied from said lumbar and dorsal parts in a direction backwardly of the seat back to said pressure receiving element under inertia of said seat occupant, said pressure receiving element is displaced in a direction upwardly of the seat back frame, with simultaneous backward and upward rotation of said crank element, while causing said pair of actuator link elements to stretch in a direction backwardly and upwardly of said seat back frame, thereby causing upward displacement of said support shaft and simultaneous anticlockwise rotation of said pair of rotating links relative to the respective two pivotal points thereof, thus resulting in said headrest being displaced in a direction from said home position towards said upwardly displaced point.

6. The structure of a seat back according to claim 5, wherein said pressure receiving element is formed by bending a rod material into a substantially U-shaped configuration having, defined there, a pair of vertical rod sections each having an upper free end portion and a lower end, and a cross rod section integrally extended between said lower end of one of said pair of vertical rod sections and said lower end of another of said pair of vertical rod sections, wherein said pair of vertical rod sections correspond to said second pressure-receiving region and said cross rod section corresponds to said first pressure-receiving region, and wherein the respective two upper free end portions of said pair of vertical rod portions are connected with said support staff.

7. The structure of seat back as claimed in claim 5, wherein said support shaft and said rotating link arranged such that, when said headrest is positioned at said upwardly displaced point, a torque (P2×L2) attained by a rebound load (RF), which attempts to cause clockwise rotation of said rotating link relative to said pivot point, is smaller than a torque (P1×L10) attained by a force transmitted to said support shaft from the seat occupant's lumbar and dorsal parts through said pressure receiving member, which attempts to cause said anticlockwise rotation of said rotating line (14).

8. The structure of seat back as claimed in claim 5, wherein said guide element has a through-hole formed therein, said through-hole being adapted to allow said holder bracket to be inserted therein, and said guide element also has, defined in said through-hole, a forward inner wall facing forwardly of the seat back and a backward inner wall facing backwardly of the seat back, wherein a pair of first support surfaces are defined in said forward and backward inner walls, respectively, so as to be disposed in a spaced-apart and offset manner in relation to said through-hole, wherein a pair of second support surfaces are defined in said forward and backward inner walls, respectively, so as to be disposed in a spaced-apart and offset manner in relation to said through-hole, and wherein said pair of first support surfaces extend in parallel with each other and are inclined by an angle equal to an angle of inclination assumed by said holder bracket when said headrest is at said home position, whereas on the other hand, said pair of second support surfaces extend in parallel with each other and are inclined by an angle equal to an angle of inclination assumed by said holder bracket when said headrest is at said upwardly displaced point, thereby allowing said holder bracket to be retained between said pair of first support surfaces when said headrest is at said home position, while allowing said holder bracket to be retained between said pair of second support surface when said headrest is at said upwardly displaced position.

* * * * *